United States Patent
Parker

(10) Patent No.: US 6,859,042 B2
(45) Date of Patent: Feb. 22, 2005

(54) ARC DETECTION BY NON-CAUSAL SIGNAL CORRELATION

(75) Inventor: Michael T. Parker, Camarillo, CA (US)

(73) Assignee: Hendry Mechanical Works, Goleta, CA (US)

( * ) Notice: Subject to any disclaimer, the term of this patent is extended or adjusted under 35 U.S.C. 154(b) by 7 days.

(21) Appl. No.: 10/164,821

(22) Filed: Jun. 7, 2002

(65) Prior Publication Data

US 2003/0227290 A1 Dec. 11, 2003

(51) Int. Cl.$^7$ ................................................. H01H 9/50
(52) U.S. Cl. ...................................................... 324/536
(58) Field of Search ................................. 324/536, 538, 324/539, 541, 543, 544; 340/659

(56) References Cited

U.S. PATENT DOCUMENTS

| | | | |
|---|---|---|---|
| 5,434,509 A | 7/1995 | Blades | 324/536 |
| 5,729,145 A | 3/1998 | Blades | 324/536 |
| 5,854,590 A | 12/1998 | Dalstein | 340/650 |
| 6,400,258 B1 * | 6/2002 | Parker | 340/310.01 |

* cited by examiner

Primary Examiner—Anjan Deb
Assistant Examiner—Donald M Lair
(74) Attorney, Agent, or Firm—Koppel, Jacobs, Patrick & Heybl

(57) ABSTRACT

A method and apparatus for detecting electrical arcs in an electrical system having a periodic power supply is disclosed. A method according to the invention compares instantaneous values of a monitored waveform both with (a) their past values at corresponding phases of the AC supply waveform, and (b) their future values at corresponding phases of the AC supply waveform. The monitored waveform is delayed or stored to allow such comparisons in near real time, to produce an output which is only slightly delayed behind the monitored waveform. An apparatus according to the present invention discloses a sampling circuit that samples electrical signals indicative of transient load conditions to produce a sampling circuit output. A storage device receives the sampling circuit's output and stores a time history of that output over an interval. A subtracting circuit receives the stored time history and subtract the time history from both of (a) a delayed version of the history, and (b) an advanced version of the history. An alarm circuit receives the output of the subtracting circuit.

21 Claims, 6 Drawing Sheets

ARC DETECTION BY NON-CAUSAL SIGNAL CORRELATION

BACKGROUND OF THE INVENTION

1. Field of the Invention

This invention relates to arc detection in AC power supplies or power systems.

2. Description of the Related Art

Electrical power systems often distribute power as an Alternating current (AC) waveform, both for historical and engineering reasons. Although the standard 60 Hz frequency is commonly used by power utilities, other frequencies such as 400 Hz are also used, for example, in civilian and military aircraft.

Any electrical power system can be troubled by undesired electrical arcing, which can cause power failure, equipment destruction, and which in severe cases can even lead to fire or explosion. The problems of electrical arcing are particularly critical in aircraft, ships, around flammable fluids or in other environments in which human life depends on proper electrical functions. In these and other applications the reliable and early detection of electrical arcs is crucial.

Previous approaches to arc detection in AC power systems include monitoring the power waveform for wideband high frequency noise and examining the detected noise to find patterns of variation synchronized to the power waveform. See for example, U.S. Pat. No. 5,729,145 to Blades (1998); Blades includes a survey of prior art arc detection patents. High frequency noise monitoring methods do not allow the monitoring system to respond to frequency components of the arc signature which may lie in the general frequency range of the AC fundamental. Furthermore, false alarms are not precluded by such methods which still respond to harmonics of the AC fundamental, whether or not arc related.

Some previous methods (including that of the Blades U.S. Pat. No. 5,729,145) require that the spectrum of the arc signature be correlated to line frequency fundamentals. Such methods do not adequately detect more chaotic arc signatures, and they are plagued by false alarms related to transient load conditions, which are often well correlated to line frequencies.

An effective electric arc monitoring system should not only detect arc conditions, but should discriminate true arc signatures from power supply transients that are not arc related. False alarms should be eliminated or limited to the greatest possible extent.

SUMMARY OF THE INVENTION

In view of the above problems, the present invention is a method and apparatus for detecting electrical arcs in an electrical system having a power supply with a periodically alternating characteristic. In method terms, the invention compares instantaneous values of a monitored waveform both with (a) their past values at corresponding phases of the AC supply waveform, and (b) their future values at corresponding phases of the AC supply waveform. The monitored waveform is delayed or stored to allow such comparisons in near real time, to produce an output which is only slightly delayed behind the monitored waveform.

More specifically, the method includes the steps: detecting a signal from the electrical system which is indicative of a dynamic load characteristic of the system; storing a dynamic representation of the signal over at least two periods of the alternating characteristic, to obtain a representation of the time variation of the signal over those periods; comparing a first value of the representation with at least one past value and at least one value of the representation occurring after said first value; and producing a detector output based on the results of the comparison.

In apparatus terms, the invention includes: a sampling circuit which samples electrical signals indicative of transient load conditions to produce a sampling circuit output; a storage device which receives the sampling circuit's output and stores a time history of that output over an interval Tstore; a subtracting circuit arranged to receive the stored time history and to subtract said time history from both of (a) a delayed version of said history, and (b) an advanced version of said history; and an alarm circuit arranged to receive the output of the subtracting circuit.

By comparing the instantaneous values of the monitored signal (typically current) with both earlier and later values, the invention simulates a non-causal signal processor (but with delayed output). This method achieves greater immunity to false alarms by better distinguishing chaotic signals (such as electrical arcs) from more causally predictable signals (such as expected loads).

These and other features and advantages of the invention will be apparent to those skilled in the art from the following detailed description of preferred embodiments, taken together with the accompanying drawings, in which:

BRIEF DESCRIPTION OF THE DRAWINGS

FIG. 4e shows the difference between the signal FIG. 4b and the signal of FIG. 4a;

DETAILED DESCRIPTION OF THE INVENTION

Figure 1:
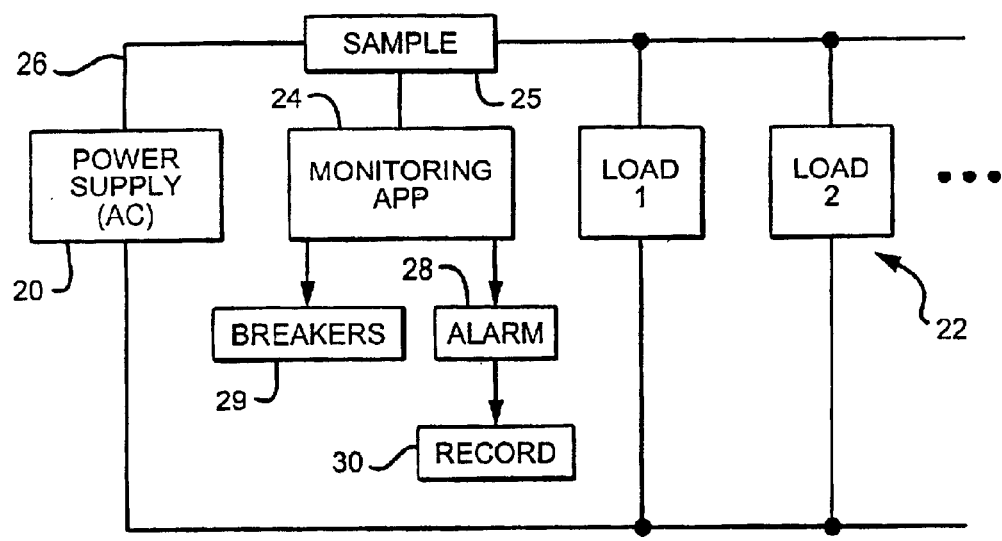
FIG. 1 is a block diagram of a typical environment within which the invention operates, including the monitoring apparatus, an AC power supply, a power bus, and at least one load.

FIG. 1 shows a typical environment within which the invention operates. An AC power supply 20 supplies power at some AC frequency to a load or a series of loads 22. The frequency of the AC power is not necessarily 60 Hz as in most permanent installations serviced by a power utility company. In many applications, such as an aircraft power supply, the frequency may be much higher, for example in the 400 Hz range.

A monitoring apparatus 24 in accordance with the invention monitors the power supply via a sampling circuit 25 disposed along the power bus 26. Either voltage, current, or preferably both are monitored. Most typically the sampling circuit could comprise a current monitoring circuit such as an inductively coupled current transformer, or a simple resistive current sampler. More sophisticated impedance measurement could also be used. The sampling circuit should provide a signal which is indicative of a dynamic, time varying load characteristic of the power system: current, voltage, or impedance.

Based on the sampled signal, the monitoring apparatus 24 determines, by the methods described below, when the conditions on the power bus are most likely indicative of an electrical arc somewhere in the overall power circuit. When such conditions are detected, the monitoring system activates an alarm circuit 28. Optionally, circuit breakers 29 or other circuit interrupters can also be automatically activated in response to detection of an arc signature. As another option, a persistent record of the arc event is recorded on some recording device 30.

Specific explanation of the invention is facilitated by first considering it as a method, in general terms. Various embodiments of apparatus to perform the method are described below, and will be more easily understood in light of the explanation of the general method.

Figure 2:
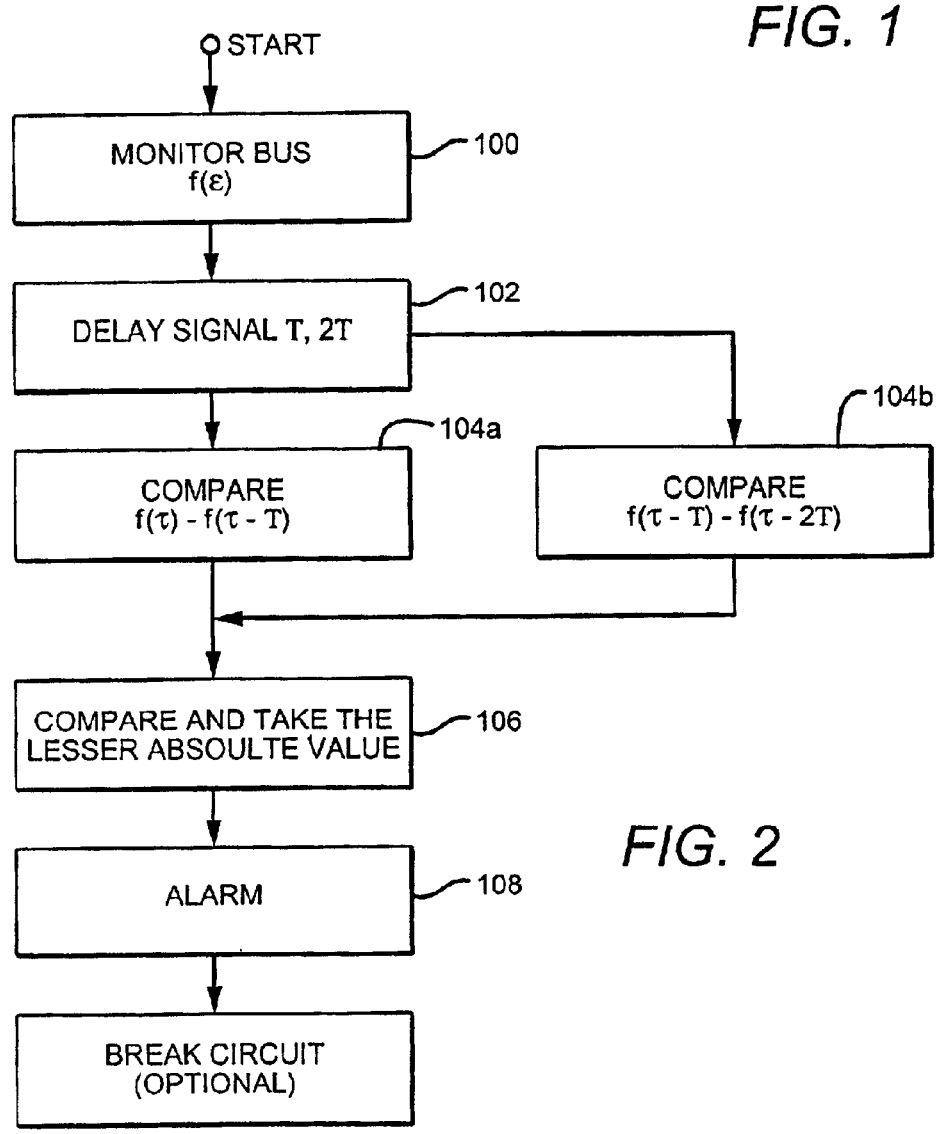
FIG. 2 is a flow diagram of a method of arc detection in accordance with the invention.

Referring now to FIG. 2, the general steps of the method are shown. First, an electrical characteristic of the periodically alternating power supply circuit is monitored (step 100) by the monitoring apparatus. Preferably, a current signal is obtained by sampling the current flowing in the power supply circuit (or some branch of interest).

Next, the time-varying signal f(t) derived from the monitoring in step 100 is delayed (step 102) by at least one delay device which introduces a delay or storage over a period of at least two periods of the alternating power supply. The delay device provide two outputs: one corresponding to the signal value delayed by one period; the other corresponding to the signal value delayed by two periods (of the AC supply). This step could also be performed as two successive delays of one period, retaining an intermediate signal corresponding to a delay of one period. Obviously, two parallel delay devices could equivalently be used, one having a delay of two periods, the other of one period. However performed, the delay step 102 produces two delayed outputs corresponding to one and two periods of delay. Greater delays could be done as well as a delay of one-half of the line period.

Next, (steps 104a and 104b) two comparisons or signal subtractions are performed. In 104a, a signal delayed by one period is subtractively compared with the instantaneous value of the signal at the present time. In 104b, the signal delayed by one period is substantially simultaneously subtractively compared with a further delayed signal (delayed by two periods). Thus, each instantaneous value of the signal (delayed one period) is compared both with its past value (delayed two periods) and with its future value (instantaneous, undelayed signal). Two detector outputs are produced: one based on the comparison of the signal with past history (past correlation output); the other based on the comparison of the signal with its future (future correlation output).

Thus, the above method simulates a non-causal filtering function in which the output is at least in part determined by the past and future behavior of the signal. Of course, the response only approximates such a behavior, as it is impossible in a rational deterministic universe to truly produce effects based on future causes. But by introducing two periods of delay, the method of the invention produces a delayed output which approximates a non-causal filter (but with output delayed so that true knowledge of the future is not required).

Finally, the two correlation outputs are compared (step 106) and the detection alarm output is produced (step 108) based on the lesser (in absolute value) of the two outputs. Thus a detection alarm circuit is activated based on the lesser of a) the difference between the signal value at a given time t and the signal one period previous to t; or b) the difference between the signal at time t and the signal value at a time one period later than t.

Optionally, signal post-processing is applied to reduce the incidence of false alarms and to provide an alarm signal which is suitable for interface with other systems. Also optionally, circuit breakers or interrupters could be activated directly or indirectly based on the alarm circuit.

Figure 3A:
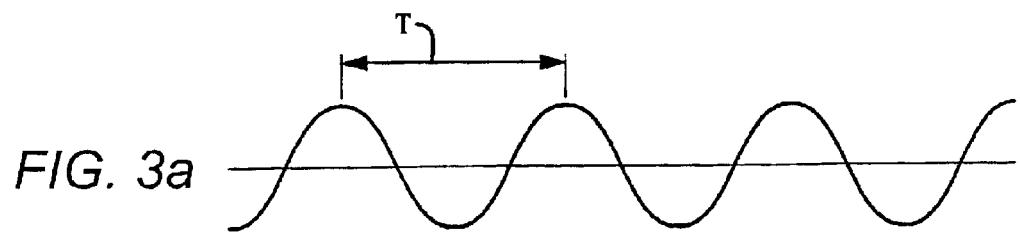
FIG. 3a is a timing diagram which shows a typical AC power supply voltage waveform corresponding to a steady state AC supply.
Figure 3B:
FIG. 3b is a timing diagram which shows a typical current signal as sampled along a power bus by a monitoring apparatus in accordance with the invention.
Figure 3C:
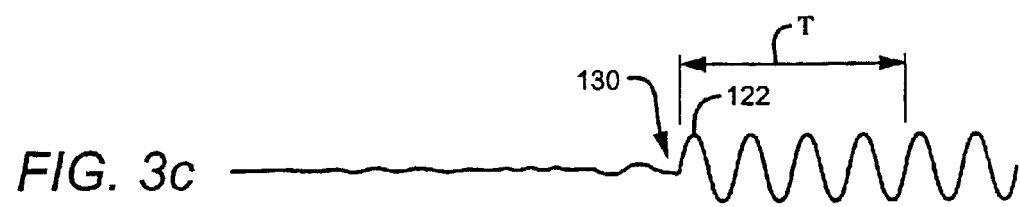
FIG. 3c is a timing diagram showing the signal of FIG. 3b delayed by one period T.
Figure 3D:
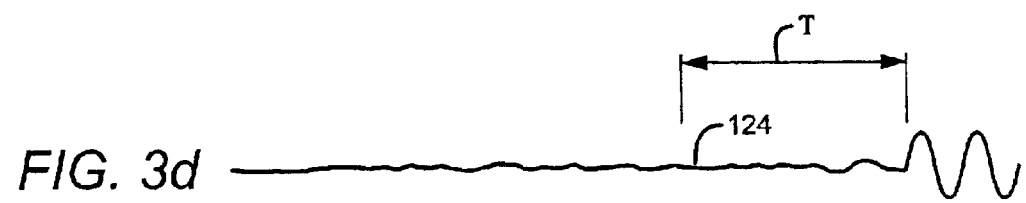
FIG. 3d is a timing diagram showing the signal of FIG. 3b delayed by two periods (2T)

FIGS. 3a–3g, show a time-domain picture of the various signals and outputs, in an example of the operation of the method in response to a routine, non-arching event. FIG. 3a shows a typical AC power supply voltage waveform corresponding to a steady state, non-arcing AC supply. This waveform supplies the temporal background for the waveforms which follow; in a typical embodiment of the invention, the method employs a local clock which is synchronized with the AC power supply waveform. FIG. 3b shows a typical current signal as sampled along a power bus by the monitoring apparatus. At 120, a current event occurs indicative of the turn-on of a device on the power bus—for example, an aircraft strobe light fires normally (without undesired arcing). A delayed version of this signal is shown in FIG. 3c, with one period T of delay introduced. A further delayed waveform is shown at FIG. 3d, corresponding to 3b with two periods of delay introduced.

Pursuant to the method summarized above, a delayed version of the signal (FIG. 3c) is subtracted from a) its past value one period in the past (FIGS. 3d), and b) its future value one period later (FIG. 3b). Thus, to pick only one instantaneous value, the value at 122 is subtracted from that at 124 (past) and also from 126 (future) to produce two outputs.

Figure 3E:
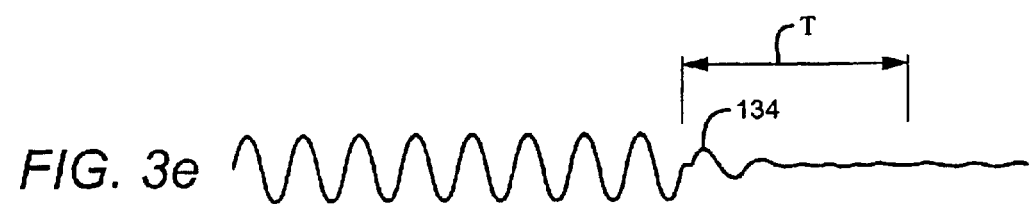
FIG. 3e is a timing diagram showing the difference between the signal in 3c and the signal in 3d.
Figure 3F:
FIG. 3f is a timing diagram showing the difference between the signal in 3c and the signal in 3b.

The waveforms of the two outputs are shown at FIGS. 3e (3c minus 3b) and 3f (3c minus 3d). Note that the waveform at 3f, which represents the difference between the signal and its delayed version, shows a noticeable response at 132, which indicates the turn-on of the strobe light. The other output, FIG. 3e, shows a markedly reduced response (at 134) to the strobe event. The lesser signal (lesser absolute value) is selected by the invention as a raw alarm signal (FIG. 3g) (preferably for further processing).

Figure 4A:
FIG. 4a is a timing diagram which shows a current signal monitored by the invention in the presence of an electrical arcing event.
Figure 4B:
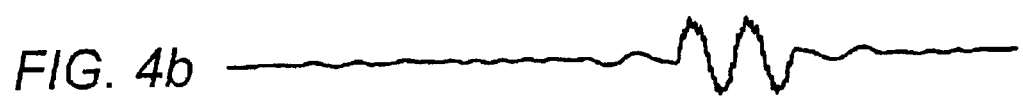
FIG. 4b shows the current signal of FIG. 4a delayed by one period T.
Figure 4C:
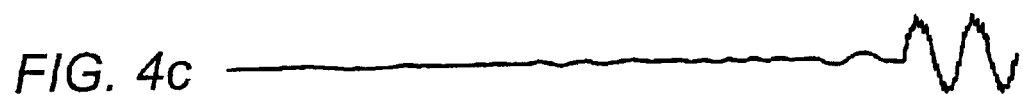
FIG. 4c shows the current signal of FIG. 4a delayed by two periods (2T)
Figure 4D:
FIG. 4d shows the difference between the signal of 4b and the signal of FIG. 4c.
Figure 4E:
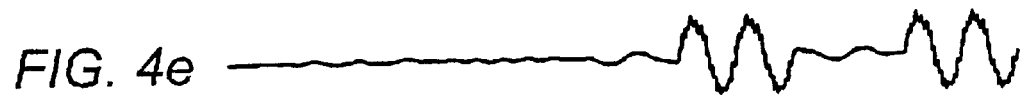
Figure 4F:
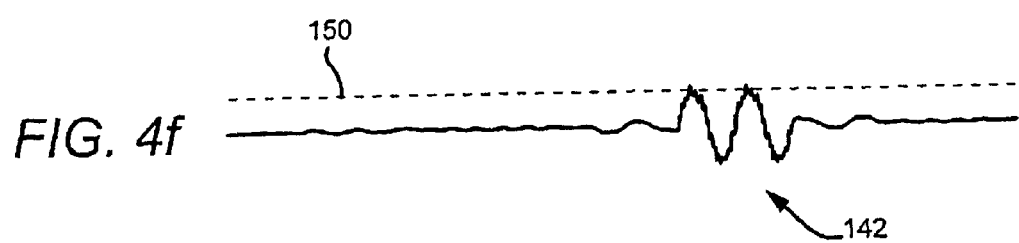
FIG. 4f shows a raw alarm signal which is created by taking at each time t the lesser (in absolute value) of the signals of FIGS. 4d and 4e.

Referring now to FIGS. 4a–4e, the corresponding signal waveforms are shown for a case corresponding to an actual arcing event. The monitored current waveform at 4a shows a chaotic event at 140, typical of an electrical arc signature. This event is characteristically uncorrelated with the periodic AC supply voltage, but rather contains chaotic components (both in time and frequency domain). FIG. 4b shows delayed version of the current monitor signal, with one period of delay; FIG. 4c shows the signal delayed by two periods. The difference between FIGS. 4b and 4c is shown at 4d; the difference between FIGS. 4b and 4a is shown at 4e. The raw alarm output at FIG. 4f is the lesser (in absolute value) of the waveforms of 4d and 4e. Note that the presence of the chaotic arcing event 140 produces a recognizable output pulse 142 in FIG. 4f. This out put raw alarm provides a signal which indicates the presence of a likely electrical arc.

Figure 3G:
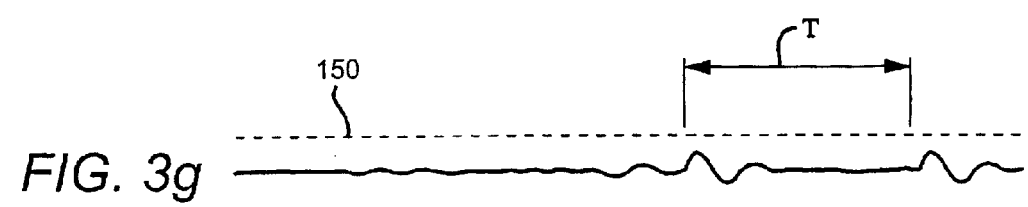
FIG. 3g is a waveform created by taking the lesser (at each time t) of the absolute values of the signals in FIGS. 3e and 3f.

The method of the invention is advantageous in that it is relatively immune to "false alarms," as demonstrated by the contrast between FIGS. 3g and 4f. FIG. 4f shows the alarm output in response to a change in load conditions due to normal, expected electrical operations along the power supply bus. Some alarm signal is produced by transients, but the response is relatively low, below threshold 150. This response is weak because the non-causal method recognizes that the new load condition persists over at least one period, and is well correlated with the future behavior on the bus. In contrast, the response at FIG. 4f to a true arcing condition shows a higher alarm output signal, which reaches above the threshold 150. This response is higher than that in 3g because arcing events produce inherently chaotic components which will not typically correlate well with either their past or future behavior. Thus, the method of the invention distinguishes relatively reliably between changes in electrical load due to system performance, and changes which are due to undesired electrical arcing; few false alarms are produced.

Greater immunity to false alarms can optionally be obtained by further processing the alarm output: for example, by averaging, integrating, or low pass filtering of the output. Typically, the parameters of such processing can be user defined to optimize performance for a given application.

In order to perform adequately, the method requires a way to delay or store the monitored signal for two or more periods of the AC supply, while essentially preserving the high frequency information in the monitored signal without undue distortion (amplitude or phase distortion). At the present time, there are at least two popular and practical methods of producing such a delay characteristic (other methods may also exist or become practical). Both an analog and a digital embodiment of apparatus for the invention are described herein as examples.

Analog Embodiment

Figure 5:
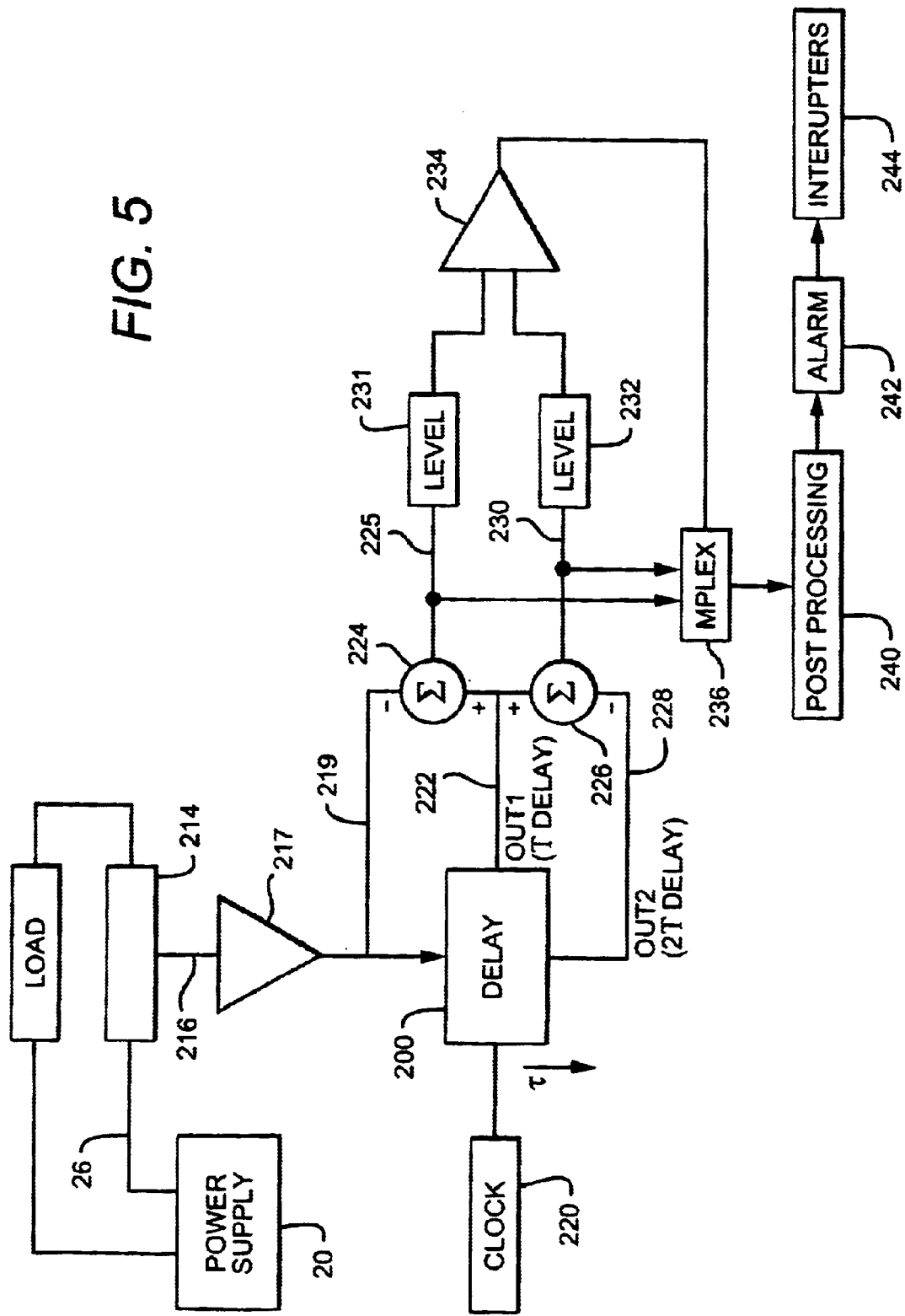
FIG. 5 is a schematic diagram of an analog embodiment of an apparatus in accordance with the invention.

FIG. 5 shows a suitable analog embodiment of an apparatus in accordance with the invention, which uses a bucket brigade device 200 to introduce delay into the monitored signal. Such devices are were available commercially and used charge coupled devices (CCDs) to store analog samples in a series of cells arranged in a first-in, first-out queue. For example, one or more MN3007 low noise 1024 stage bucket brigade integrated circuit (previously available from Panasonic) could be used. As an alternative, the bucket brigade device can be designed and manufactured using known techniques. Two such devices can be used in series, with the output of the first tapped to provide the intermediate delay (T) and the output of the second providing the longer delay (2T).

Power supply 20 provides power to an unknown load 210 via some power bus 26. A monitoring point 214 provides a signal which indicates current conditions on the power bus. For example, inductive or direct current sampling can be used. Alternatively, more sophisticated techniques such as monitoring the impedance of the load 210 can supply a monitoring signal. However derived, a monitoring signal 216 is preferably buffered by buffer amplifier(s) 217 and input into a delay circuit 200 (for example, bucket brigade device.) The delay circuit 200 produces two outputs, one delayed by T and the other by 2T, where T is the period of the AC power supply 20.

As is well known, a bucket brigade device serving as delay device 200 will require a clock, which is provided by clock circuit 220. In order to provide accurate delay of T, this clock should preferably be synchronized and in phase with the AC power supply. As discussed below, this can be done by using a phase locked loop to provide a clock which is synchronous in phase with the AC power supply but which runs at an integer multiple of the AC period, where the integer multiple corresponds to the number of buckets in the bucket brigade device.

A delayed version of the signal at 222 (delayed by T) is subtractively summed at summing amplifier 224 with the original monitor signal 219, to produce a first summed output 225. Similarly, the signal 222 is also subtractively summed at second summing amplifier 226 with a more delayed signal (228, delayed by 2T) which produces a second summed output 230. These outputs correspond to: (225) a delayed version of the difference between the monitor signal and its value one period later; and (230) the difference between the monitor signal and its value one cycle earlier, where it is to be understood that the cycle referred to is one cycle of the AC power supply 20.

The signals 225 and 230 are further processed by respective level detectors 231 and 232 which produce outputs indicative of the average levels of the absolute values of 225 and 230, respectively. The average levels are then compared by comparator 234, and the comparator output is input to a multiplexer 236. The multiplexer 236 receives both alarm signals 225 and 230, and selects the lower (in absolute value) as the more conservative indicator of an arcing condition. Selecting the lower of said signals has been found to reduce the incidence of "false alarm" outputs.

Preferably, some further post processing of the alarm signal is performed, for example by post processing filter 240 in FIG. 5, which receives the raw alarm signal 242 and processes it to further reduce the incidence of false alarms. For example, a long time-constant integrator or a very low frequency low-pass filter with time constant in the range of 0.1 sec has been found suitable for many applications. The proper time constant can be determined based upon the level of expected circuit noise and the frequency of the power supply. Time constants on the order of several AC power cycles have been found suitable in many applications. The processed alarm signal activates an alarm circuit 242 and optionally circuit interrupts 244 if appropriate for the severity of the arc condition.

In some applications, the delay in device 200 can remain substantially fixed so long as the frequency of the alternating current fundamental of the power source is stable or as long as the requirements of the application are satisfied by the performance of the alarm. However, in other applications the variations in AC frequency or phase of the power supply tend to degrade the performance of the alarm system. In such instances, the preferred embodiment of the invention includes a clock circuit which provides to the delay device a clock which is phase locked as an integer multiple of the AC power supply period, and tracks said AC period notwithstanding any phase or frequency changes.

Figure 6:
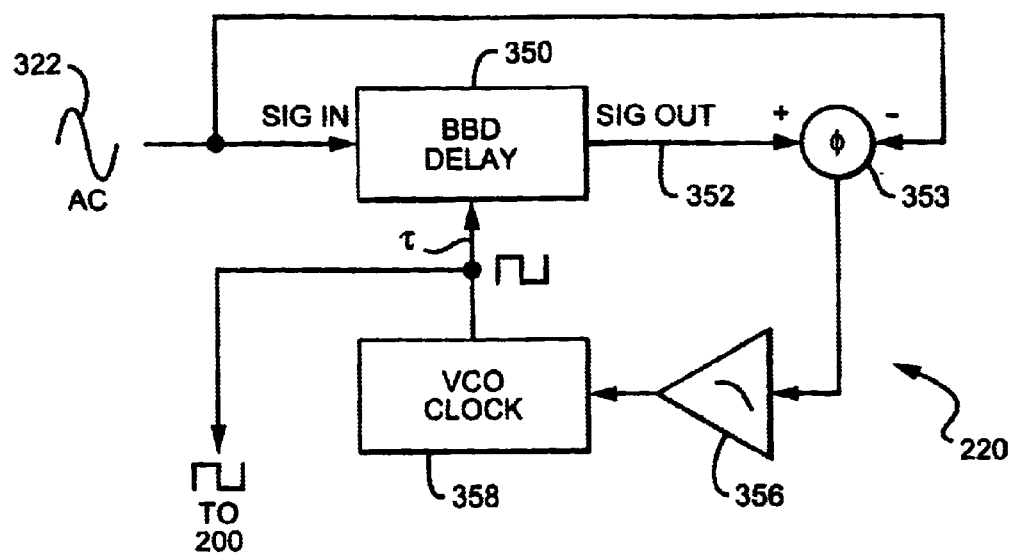
FIG. 6 is a schematic diagram of a clock synchronization circuit optionally used in connection with the invention, to improve and stabilize phase relationships between the clock and the AC power cycle.

A suitable clock synchronization circuit 220 is shown in detail in FIG. 6. In this circuit the clock serves to the AC line frequency to provide a clock at an integer multiple of the AC line frequency. An AC signal 322 (suitably AC voltage from the power bus) is applied to the input of a Bucket Brigade device 350, which produces a time delayed signal corresponding to the line input. The delayed output 352 is compared with the signal 322 by a phase comparator 353, is low-pass filtered by filter 356 and applied to a frequency control input of a clock generator 358. The clock signal generated by clock generator 358 in turn provides a clock to the Bucket Brigade device 350 and to a counterpart BBD device 200 (discussed above, in connection with FIG. 5). This circuit will be recognized as a variation on the phase-locked loop, and will provide a clock signal which tends to remain locked in phase relationship with the AC line voltage 222. In method terms, this embodiment includes the steps of providing a clock signal which is stabilized in phase relationship with the AC line signal.

If any frequency or phase drift occurs, the phase comparator 252 will produce an error signal which will cause the clock frequency to track until equilibrium is again established. The center clock frequency can be set to a value near a desired integer multiple of the AC clock frequency, where the multiple depends on the number of time slots available in the BBD.

Digital Embodiment

The invention can also be embodied as a digital realization. The choice of digital or analog embodiment in a particular application will be dictated by a number of factors, including the cost of the components and the speed required. However, the decreasing cost and power requirements of digital electronics makes this alternative embodiment attractive in many applications.

Figure 7:
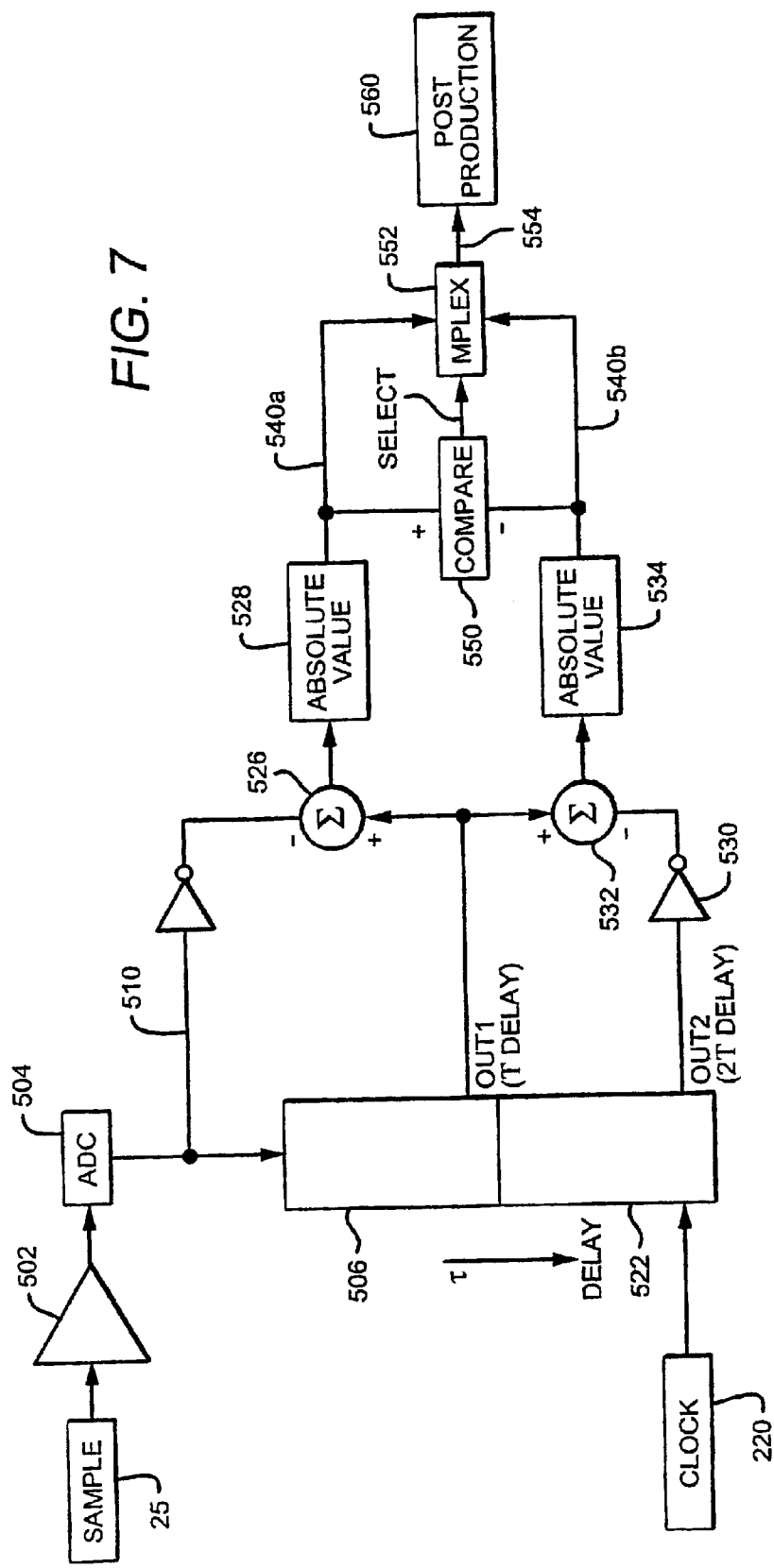
FIG. 7 is a schematic diagram of one digital embodiment of an apparatus in accordance with the invention.

A digital embodiment of the invention is shown in FIG. 7. As in the analog embodiment previously discussed, an input signal is derived from a sampling circuit 25 (typically a current monitoring circuit such as an inductively coupled current transformer, or a simple resistive current sampler. More sophisticated impedance measurement could also be used, as previously mentioned). The sampled signal from 25 is typically buffered by buffer 502, then converted into digital form by an Analog to Digital Converter (ADC) 504. For many typical applications, a 12-bit converter sampling and converting at a rate of 25K samples per second is adequate. The precision and sampling rate required will vary somewhat according to the system to be monitored, with higher sampling rates being more appropriate to systems with higher frequency AC power supplies, as will be apparent.

The digitized monitor signal, typically in parallel form is then input to a delay or storage device 506 such as a first in, first out (FIFO) shift register. Only one input an output signal path is shown for each data path, but this path should be understood to symbolize more than one bit per data sample, which would typically be routed as multiple parallel bit signal paths. Thus, for example, if 16-bit precision is used, signal paths 510 (monitor signal, undelayed) and outputs OUT1 and OUT2 would each comprise 16 signal bits in parallel. A FIFO shift register such as the 14562 is suitable for use as delay or storage element 506: that commercially available shift register provides 128X1 register slots each 1 bit wide; each clock cycle shifts the contents one slot along a linear array of addresses.

The delay element 506 is clocked by a clock signal provided by clock circuit 220, which is preferably provided by a phase locked loop circuit as previously discussed, and thus preferably is phase or frequency synchronized to the normal AC cycle of the power supply bus being monitored. The clock is set at an integer multiple of the AC power bus frequency, with the integer chosen so that the output OUT1 is delayed by substantially exactly one period of the AC power supply.

A second output, OUT 2, is output from a second shift register shown as 522, which operates synchronously in series with the first delay device 506 and receives as its input the delayed output of 506. It is obvious that one register with dual delayed outputs could equivalently be used, provided that the dual outputs are arranged so that the second output OUT 2 is delayed by substantially 2T while the first output is delayed by T. As a further alternative, two shift registers with unequal length could be arranged in parallel to provide outputs delayed respectively by T and 2T. Other equivalents could be readily conceived by those with skill in the art, and are within the scope of the invention.

The delayed output OUT1 (delayed by one period T) is then summed, in a first data path, with the two's complement of the undelayed signal 510 at digital adder 526 (equivalently, 510 and OUT could be digitally subtracted). The result of this summation is then processed by a circuit (528) which takes the absolute value of the data byte. Similarly, in a parallel data path OUT2 is complemented by 530 and summed with OUT1 at adder 532. The result is converted to an absolute value by absolute value circuit 534.

These circuits thus produce two parallel digital signals, 540a and 540b which represent two respective operations. First, 540a represents the absolute value of the difference between OUT1 (the monitored signal delayed by one period T) and the future (undelayed) behavior of that same signal (510). The magnitude of 540a is in inverse relation to the correlation between the signal and its future behavior. Thus when the monitored signal is perfectly periodic with period T (whatever higher frequency components may be present) the output 540a will remain at zero.

Similarly, 540b represents the absolute value of the difference between the (delayed) signal OUT1 and the further delayed signal OUT2. This signal is in inverse relation to the correlation between the monitored signal and its past behavior.

A level comparator 550 compares the outputs 540a and 540b to decide which output is lower (less of an alarm indication). The lower signal is then selected, based on the comparator output, by multiplexer 552. It has been found that selecting the more conservative indicator of arcing in this manner reduces the occurrence of false alarm signals in the ultimate alarm output 554.

Optionally, further processing of the alarm signal may advantageously be performed by post processing circuit 560. Preferably, the alarm signal is further processed in circuit 560 by discarding alarm signals which are of a very transient nature: for example, an alarm condition which lasts for less than ⅛ foe a cycle of the AC power supply. This can be done by a low pass filter (either digital or analog). Further suppression of false alarms can be accomplished by accumulating alarm signal over multiple cycles of the AC power supply, for example, by accumulating the alarm signal for at least one but less than ten cycles. In this case, the post-processed alarm signal is enabled only if the alarm signal exceeds alarm threshold for at least one but less than n consecutive cycles, during at least part of each cycle.

While several illustrative embodiments of the invention have been shown and described, numerous variations and alternate embodiments will occur to those skilled in the art. For example, equivalent embodiments could be realized using field programmable gate arrays, programmable digital signal processing (DSP) chip sets, or hybrids of digital and analog circuits. Enhancements such as automatic gain control (AGC) could be added to better match the amplitude of the various signals at critical summing nodes, and to compensate for gain and signal level variations. The sensitivities and gains could be scaled varied, for example to normalize response with respect to power supply current. Time delays of multiples of T could be used (where T is the period of the AC power supply), so that a signal is compared with its history some number of periods past and its future behavior some number of periods later. Such variations and alternate embodiments are contemplated, and can be made without departing from the sprit and scope of the invention as defined in the appended claims.

I claim:

1. A method of detecting electrical arcs in an electrical system having a power supply with a periodically alternating characteristic, comprising the steps of:
   detecting a signal from the electrical system which is indicative of a dynamic load characteristic of the system;
   storing a dynamic representation of said signal over at least one period of said alternating characteristic, to obtain a representation of the time variation of said signal over said period; and
   comparing a first value of said representation with at lest one earlier value and at least one value of said representation occurring later,
   producing a detector output based on the results of said comparing.

2. A method of detecting electrical arcs in an electrical system having a power supply with a periodically alternating characteristic, comprising the steps of:
   detecting a signal from the electrical system which is indicative of a dynamic load characteristic of the system;
   storing a dynamic representation of said signal over at least one period of said alternating characteristic, to obtain a representation of the time variation of said signal over said period;
   comparing a first value of said representation with at least one earlier value and at least one value of said representation occurring later,
   producing a detector output based on the results of said comparing;
   wherein said comparing step comprises:
   subtracting said first value from said past value to obtain a first detection signal;
   subtracting said first value from said later value to obtain a second detection signal; and
   selecting one of said first and second detection signal which indicates the greatest degree of correlation.

3. The method of claim 2 wherein said step of storing comprises sampling said signal at regular clock intervals at a clock rate which is in synchronous relationship to the alternating power supply characteristic.

4. The method of claim 3, wherein said past value corresponds to a sample of said signal at a time earlier by and integer multiple of one-half cycle of the alternating power supply characteristic, and said future value corresponds to a sample of said signal at a time later by an integer multiple of one-half of the alternating power supply;
   where said integer is any positive integer greater than or equal to one.

5. The method of claim 4, wherein said sampling comprises sampling at said regular clock intervals, and said clock rate is greater than and in a predetermined relation to the frequency of the alternating power supply, so that a plurality of samples are stored during a cycle of the alternating power supply.

6. The method of claim 5, wherein said samples are stored.

7. The method of claim 4, wherein said storing comprises:
   converting said signal into a digital representation; and
   storing sequential values of said digital representation in a digital storage device.

8. The method of claim 7, wherein said storage device comprises at least one first in, first out (FIFO) shift register.

9. The method of claim 7, wherein said digital storage device is a random access memory and wherein at least one of said steps is performed by a microprocessor.

10. The method of claim 2, wherein the step of producing a detector output further comprises:
    accumulating a sequence of results of said comparing step, and analyzing a said sequence of results to detect characteristics indicative of an electrical arc.

11. A system for detecting electrical arcs by monitoring an alternating current power supply which supplies power to a load, comprising:
    a sampling circuit which samples electrical signals indicative of transient load conditions to produce a sampling circuit output;
    a storage device which receives said sampling circuit output and stores a time history of said output over an interval Tstore;
    a subtracting circuit arranged to receive the stored time history and to subtract said time history from both of (a) a delayed version of said history, and (b) an advanced version of said history; and
    a monitoring circuit arranged to receive the output of said subtracting circuit.

12. The system of claim 11, wherein said sampling circuit produces a digital representation of said electrical signals as its output;
    and wherein said storage device comprises a digital storage device.

13. The system of claim 12, wherein said sampling circuit samples said signal at regular clock intervals at a clock rate which in synchronous relationship to the alternating power supply characteristic.

14. The system of claim 11, wherein said sampling circuit comprising an analog signal sampling circuit, and said storage device comprises an analog signal storage device.

15. The system of claim 14, wherein said storage device comprises a bucket brigade device.

16. The system of claim 11, wherein said sampling circuit samples power supply current.

17. A system for detecting electrical arcs by monitoring an alternating current power supply which supplies power to a load, comprising:
    a sampling circuit which samples electrical signals indicative of transient load conditions to produce a sampling circuit output;

a storage device which receives said sampling circuit output and stores a time history of said output over an interval Tstore;

a subtracting circuit arranged to receive the stored time history and to subtract said time history from both of (a) a delayed version of said history, and (b) an advanced version of said history; and a monitoring circuit arranged to receive the output of said subtracting circuit;

wherein said subtracting circuit is arranged to subtract a first value of said time history corresponding with a first time t1 from a second value of time history at time t2, where t2 is earlier than t1;

said subtracting circuit further arranged to subtract said first value with a third value of said time history corresponding to a time t3, where t3 is later than t1.

18. A system for detecting electrical arcs by monitoring an alternating current power supply which supplies power to a load, comprising:

a sampling circuit which samples electrical signals indicative of transient load conditions to produce a sampling circuit output;

a storage device which receives said sampling circuit output and stores a time history of said output over an interval Tstore;

a subtracting circuit arranged to receive the stored time history and to subtract said time history from both of (a) a delayed version of said history, and (b) an advanced version of said history; and a monitoring circuit arranged to receive the output of said subtracting circuit;

wherein said sampling circuit produces a digital representation of said electrical signals as its output;

and wherein said storage device comprises a digital storage device;

wherein said sampling circuit samples said signal at regular clock intervals at a clock rate which in synchronous relationship to the alternating power supply characteristic; and wherein said sampling circuit samples said signal at said regular clock intervals, and said clock rate is greater than and in a predetermined relation to the frequency of the alternating power supply, so that a plurality of samples are stored during a cycle of the alternating power supply.

19. The system of claim 18, wherein said delayed version of said history is delayed by substantially one period of said alternating current power supply, and said advanced version is advanced by substantially one period of said alternating current power supply.

20. The system of claim 18, wherein said storage device comprises a shift register.

21. The system of claim 18, wherein said storage device comprises digital memory.

* * * * *